United States Patent
Cazabon et al.

(10) Patent No.: US 7,256,800 B2
(45) Date of Patent: Aug. 14, 2007

(54) VERTEX INTERACTION

(75) Inventors: Rodolfo Jose Cazabon, San Francisco, CA (US); Jeffrey D. Yates, Greenbrae, CA (US)

(73) Assignee: Autodesk, Inc., San Rafael, CA (US)

( * ) Notice: Subject to any disclaimer, the term of this patent is extended or adjusted under 35 U.S.C. 154(b) by 208 days.

(21) Appl. No.: 10/894,670

(22) Filed: Jul. 20, 2004
(Under 37 CFR 1.47)

(65) Prior Publication Data

US 2005/0062751 A1 Mar. 24, 2005

Related U.S. Application Data

(60) Provisional application No. 60/488,820, filed on Jul. 21, 2003.

(51) Int. Cl.
*G06T 15/00* (2006.01)
(52) U.S. Cl. ..................................... 345/629
(58) Field of Classification Search ............... None
See application file for complete search history.

(56) References Cited

U.S. PATENT DOCUMENTS 5,706,417 A * 1/1998 Adelson .................. 345/640

6,256,041 B1 7/2001 Deering
6,411,301 B1 6/2002 Parikh et al.

OTHER PUBLICATIONS

Clayton et al. 3D Studio Max Applied, 1996, Advanstar Communications, Inc., pp. 160-168 and 241-250.*

* cited by examiner

*Primary Examiner*—Mark Zimmerman
*Assistant Examiner*—Andrew Yang
(74) *Attorney, Agent, or Firm*—Patterson & Sheridan, LLP

(57) ABSTRACT

A method is disclosed for defining surface properties in a virtual world. An object includes vertices defining a surface and surface properties. A number of vertex data layers are provided that permit a user to define several properties, including color, that are then combined according to user-specified vertex layer interactions to produce layer values specifying physical properties of the surface. When user input is received at a specified layer, and an object surface property, such as color, is modified. A physical property of the object is updated by combining properties from multiple vertex layers according to user-specified vertex layer interactions to modify the layer values.

19 Claims, 20 Drawing Sheets

INVENTION

| NODE INFORMATION FOR BASEBALL OBJECT | | | 1201 |
|---|---|---|---|
| PARAMETER | TYPE | VALUE(S) | |
| POINTER TO PARENT NODE IN SCENE TREE | ADDRESS | 0x0145E324 | 1301 |
| POSITION OFFSET FROM PARENT NODES | FLOAT3 | 1.03, 7.0, 302 | 1302 |

*Figure 13*

| LIST OF VERTICES FOR BASEBALL OBJECT | | | 1202 |
|---|---|---|---|
| POINTER TO VERTEX #1 | ADDRESS | 0x0145E720 | 1401 |
| POINTER TO VERTEX #2 | ADDRESS | 0x0145E824 | 1402 |
| POINTER TO VERTEX #3 | ADDRESS | 0x0145E928 | 1403 |
|  |  |  |  |
| POINTER TO VERTEX #521 | ADDRESS | 0x014A1320 | 1404 |
| END OF LIST MARKER | ADDRESS | 0x00000000 | 1405 |

| ON | ASCII DESCRIPTOR | OPERATION | DOMAIN |
|---|---|---|---|
| YES | Random bits | LIGHTEN | GRAYSCALE |
| NO | Unnamed | NORMAL | RGB |
| NO | Unnamed | NORMAL | RGB |
| YES | Surface colour | MULTIPLY | RGB |
| YES | Slip mask | NORMAL | MASK |
| YES | Slip factor | LIGHTEN | SLIP |
| NO | Unnamed | NORMAL | RGB |
| NO | Unamed | NORMAL | RGB |
| NO | Hue adjust | NORMAL | RGB |
| YES | <END MARKER> | - | - |

| VERTEX NODE DATA | | | 1214 |
|---|---|---|---|
| PARAMETER | TYPE | VALUE(S) | |
| POINTER TO PARENT NODE IN SCENE TREE | ADDRESS | 0 #x0144FE32 | ←1701 |
| POSITION OFFSET FROM PARENT NODES | FLOAT 3 | -2.35, 0.5, 9.03 | ←1702 |
| POINTER TO LAYER STACK FOR VERTEX | ADDRESS | 0x0143002A | ←1703 |

*Figure 17*

| VERTEX LAYER STACK | | 1215 |
|---|---|---|
| NUMBER | VALUE(S) | |
| 1 | 32 | ←1801 |
| 2 | 72 | ←1802 |
| 3 | 1 | ←1803 |
| 4 | 255,255,255 | ←1804 |
| 5 | 255 | ←1805 |
| 6 | 118 | ←1806 |
| ⋮ | ⋮ | |

*Figure 18*

VERTEX INTERACTION

CROSS-REFERENCE TO RELATED APPLICATIONS

This application claims benefit of U.S. provisional patent application Ser. No. 60/488,820, filed Jul. 21, 2003, which is herein incorporated by reference.

BACKGROUND OF THE INVENTION

1. Field of the Invention

The present invention relates to defining surface properties in a virtual world. In particular, it relates to facilitating interaction between surface properties in a controllable way.

2. Description of the Related Art

Computer aided design and computer gaming are converging fields in the sense that both use an increasingly common underlying framework to create realistic renderings of a virtual world. Objects are typically represented in a scene tree, that defines a hierarchical set of relationships between objects, constituent objects, and vertices, of which all the objects in a scene are ultimately composed.

As the capabilities of such frameworks increase, and the power of the processing systems that run them also increases, implementation of these capabilities in a manageable way becomes increasingly difficult. Theoretically, such systems are capable of a high degree of realism. However, the provision of such capabilities is no longer a question of science: it has become a problem in complexity management. Furthermore, it is not strictly the case that such systems have to model the physical appearance and other properties of real objects in a natural way. Creative use of such systems relies upon there being provided a user interface that encourages users to explore and create ideas that would be impossible or unlikely in the real world.

Management of the properties of virtual objects is an overwhelmingly complex subject. In the art, this complexity is hidden from the users of design systems so as to ensure that the creative workflow is not interrupted. However, the potential for such systems is thereby considerably reduced.

SUMMARY OF THE INVENTION

The present invention provides a method of inputting user data for defining an object surface characteristic in images rendered in a processing system. The processing system includes processing means, data storage means, user input means, display means and instruction storage means that stores instructions executed on the processing means in order to perform rendering of an object defined by object vertices stored in the data storage means. Each of the object vertices includes vertex position information and a plurality of interacting vertex layers.

Various embodiments of the invention include a computer readable medium storing instructions for causing a computer to define surface properties in a virtual environment by performing the steps of providing a set of vertices defining a surface, each vertex including position information and an index of layers storing a plurality of interacting layers, receiving layer interaction definitions each layer interaction definition specifying an operation used to process a portion of the interacting layers stored in the index of layers, and processing the plurality of interacting layers using the layer interaction definitions to produce a vertex layer stack for each vertex, each vertex layer stack including layer values representing physical properties of the surface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 13 details the node information shown in FIG. 12, according to one embodiment of the present invention;

FIG. 14 details the list of vertices shown in FIG. 12, according to one embodiment of the present invention;

FIG. 15 details the layer index shown in FIG. 12, according to one embodiment of the present invention;

FIG. 17 details the vertex node data shown in FIG. 12, according to one embodiment of the present invention;

FIG. 18 details the vertex layer stack shown in FIG. 12, according to one embodiment of the present invention;

DETAILED DESCRIPTION

Figure 1:
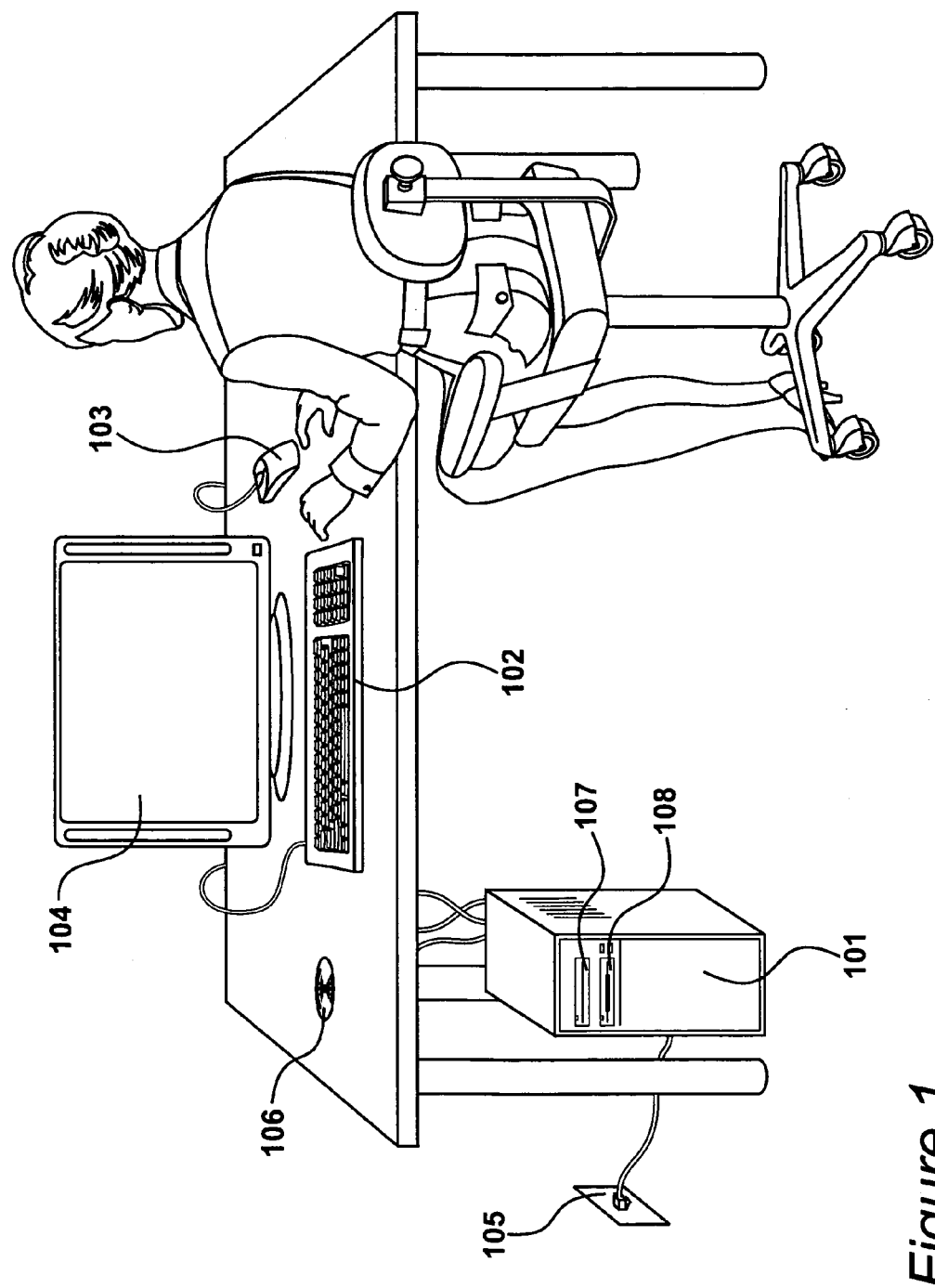
FIG. 1 shows a graphical workstation, including a processing system, a CDROM disk, a network connection and a monitor, according to one embodiment of the present invention.

FIG. 1 shows a graphical workstation at which graphical design and rendering processes are performed, according to one embodiment of the present invention. A processing system 101 receives user input signals from a keyboard 102 and from a mouse 103 or other pointing device. Results of processing and user interfaces are displayed on a monitor 104, thereby providing fully interactive graphical processing. A network connection supplies signals to and from the processing system 101 over a network 105, over which instructions and data for the processing system 101 may be transferred. The processing system 101 has a CDROM/DVD drive, and a CDROM 106 or the network 105 provides instructions for performing design operations using the processing system 101.

Figure 2:
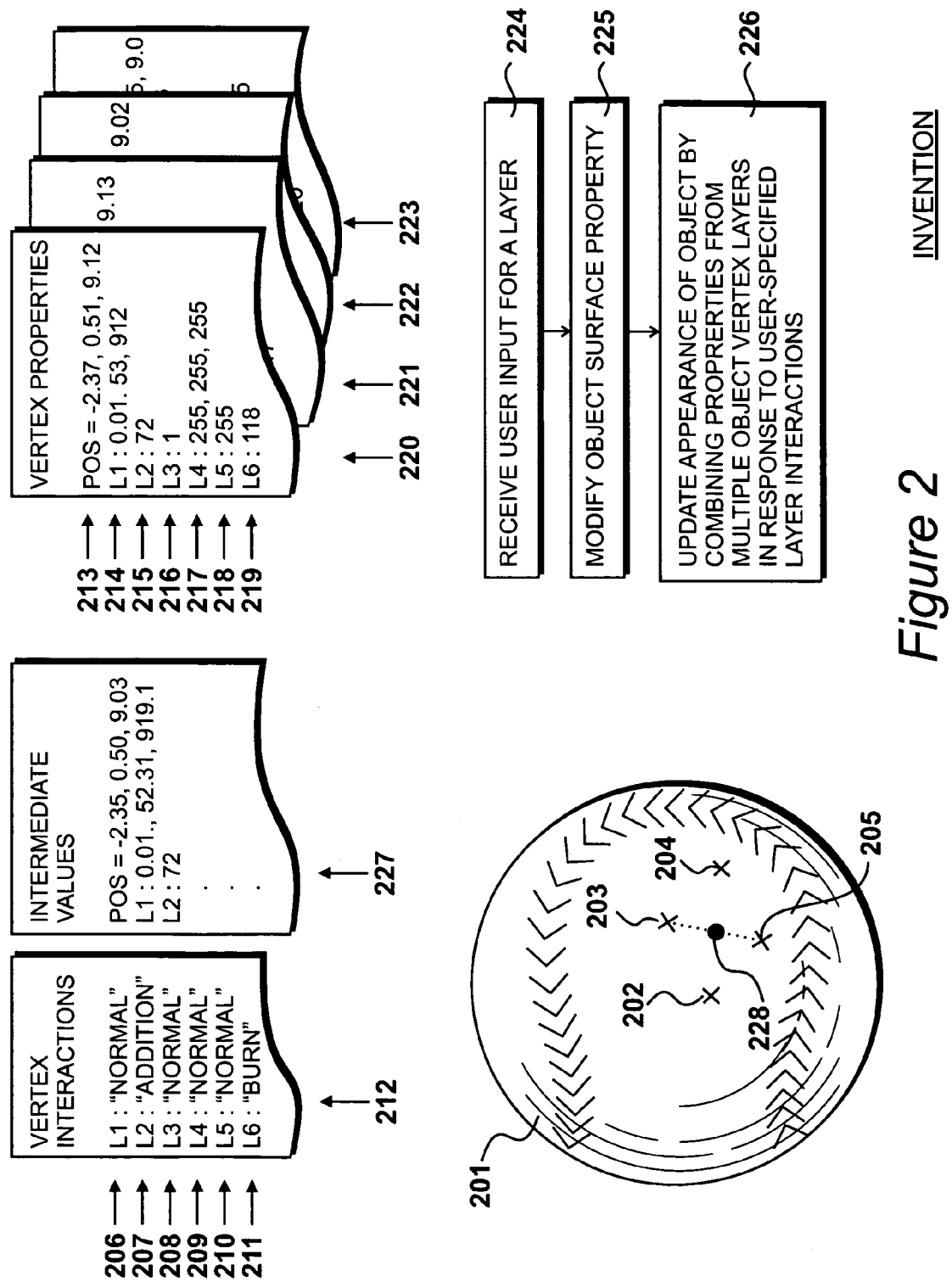
FIG. 2 shows one embodiment of the present invention.

One embodiment of the present invention is summarised in FIG. 2. A user interface for a design application is displayed on the monitor 104. User input signals are supplied from the mouse 103 to the processing system 101 in response to user operations for the design of a virtual object such as a baseball 201. The virtual object 201 is defined by a number of vertices, including vertices shown at 202, 203, 204 and 205. The vertices define specific locations in three dimensions that are connected together in the form of a mesh. In this way, many complex shapes may be constructed. Vertices such as those shown connect together points on an object's surface. The areas between the vertices are smoothly curved by interpolation between vertex values, so as to provide realistic rendering of an object.

The vertices of an object 201 define its structure. Additional data is provided for each vertex 202, 203, 204 and 205 in order to define additional vertex properties other than vertex position. An example of an additional data value is the vertex color. By defining the color of several vertices 202 to 205, detailed color variations across the surface of an object are provided. This enables complex objects to be realistically rendered in a computer game or computer-aided design application.

A number of vertex data layers 206 to 211 are provided that permit the user to define several properties, including color, that are then combined in user-definable ways according to user-specified vertex layer interactions 212 for the object 201. Each vertex has a position value 213, defining its location in three dimensions, and layer values 212 to 218, define different properties, including color, surface slipperiness and so on. Each vertex 202 to 205 has independent data structures 220, 221, 222, 223 to represent layer values.

User input for a selected layer 207 is supplied to the processing system 101 from the mouse 103 or other input device at step 224. At step 225 the surface property represented by selected layer is modified by updating layer values in one or several vertices 202 to 205. At step 226 the appearance of the object 201 is updated by combining the vertex layer values 213 to 219 in response to respective user-specified layer interactions 212.

Intermediate layer values 227 may be generated in response to a user request to create an additional vertex 228, by interpolating between the layer values for several existing object vertices 202 to 205.

Figure 3:
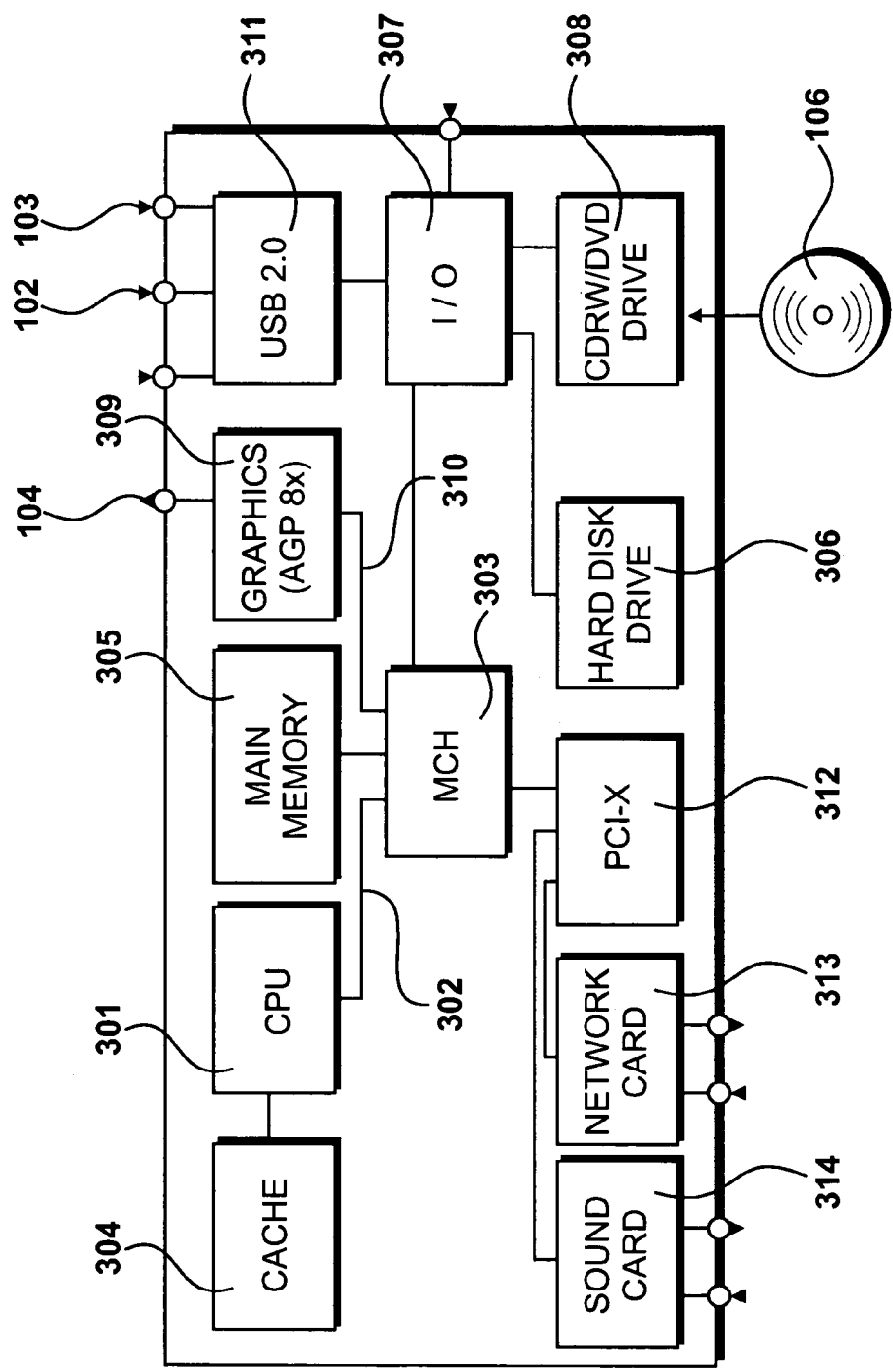
FIG. 3 details the processing system shown in FIG. 1, including a hard disk drive and a main memory, according to one embodiment of the present invention.

The components of the processing system 101 are detailed in FIG. 3 and, in the preferred embodiment of the present invention, said components are based upon the Intel® E7505 hub-based Chipset.

The system includes an Intel® Pentium™ Xeon™ central processing unit (CPU) 301 running at three Gigahertz, which fetches instructions for execution and manipulates data via an Intel® E7505 533 Megahertz system bus 302 providing connectivity with a Memory Controller Hub (MCH) 303. The CPU 301 has a secondary cache 304 comprising five hundred and twelve kilobytes of high speed static RAM, for storing frequently-accessed instructions and data to reduce fetching operations from a larger main memory 305 via the memory controller hub 303. The memory controller hub 303 thus co-ordinates data and instruction flow with the main memory 305, which is one gigabyte in storage capacity. Instructions and data are stored in the main memory 305 and the cache 304 for access by the central processing unit 301. A hard disk drive 306 provides non-volatile bulk storage of instructions and data via an Input/Output Controller Hub (ICH) 307. The I/O controller hub 307 similarly provides connectivity to DVD-ROM re-writer 308 which reads the CDROM 106 shown in FIG. 1. Connectivity is also provided to USB 2.0 interface 311, to which the keyboard 102 and mouse 103 are attached, all of which send user input data to the processing system 101.

A graphics card 309 receives graphic data and instructions from the central processing unit 301. The graphics card 309 is connected to the memory controller hub 303 by means of a high speed AGP graphics bus 310. A PCI interface 312 provides connections to a network card 313 that provides access to the network 105, over which instructions and or data may be transferred. A sound card 314 is also connected to the PCI interface 312 and receives sound data or instructions from the CPU 301.

The equipment shown in FIG. 3 constitutes the components of an IBM™ PC compatible processing system, according to one embodiment of the present invention. Similar functionality can be provided using an Apple™ PowerPC™ architecture based processing system. Other architectures may also be advantageously utilised, including portable processing systems and thin client processing systems attached to a network in which some or all of the design processing may be carried out either remotely or in a number of physically distant processing systems.

Figure 4:
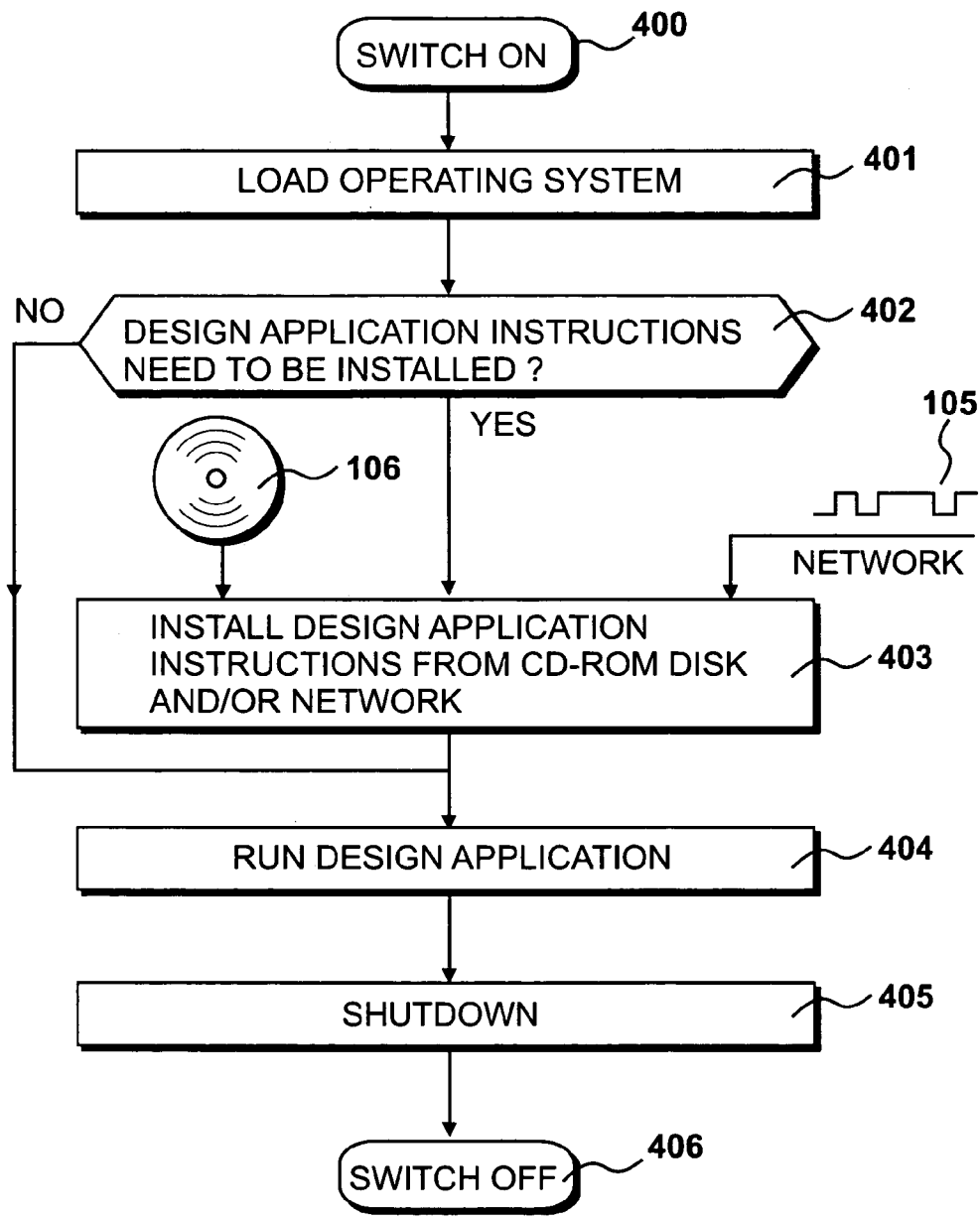
FIG. 4 summarises steps performed by the processing system shown in FIG. 1, including a step of installing a design application and a step of running a design application, according to one embodiment of the present invention.

FIG. 4 shows a summary of operations performed by the processing system 101 detailed in FIG. 2, according to one embodiment of the present invention. At step 400 the processing system 101 is switched on. At step 401 an operating system is loaded into the main memory 305 of the processing system. The processing system 101 is used to perform design operations for virtual objects, such as objects that may be used in computer games, virtual reality or computer-aided design. In order to do this, the processing system 101 needs to be loaded with appropriate instructions for creating, editing and rendering virtual objects 201. Usually such instructions are stored on the hard disk drive 306. At step 402 a question is asked as to whether such instructions need to be installed on the hard disk drive 306. If not, control is directed to step 404. Alternatively, at step 403, design instructions are installed onto the processing system either from the network 105 or the CDROM disk 106. At step 404 the design instructions are executed, thereby enabling the user to create and modify objects, including object 201, as required.

Figure 5:
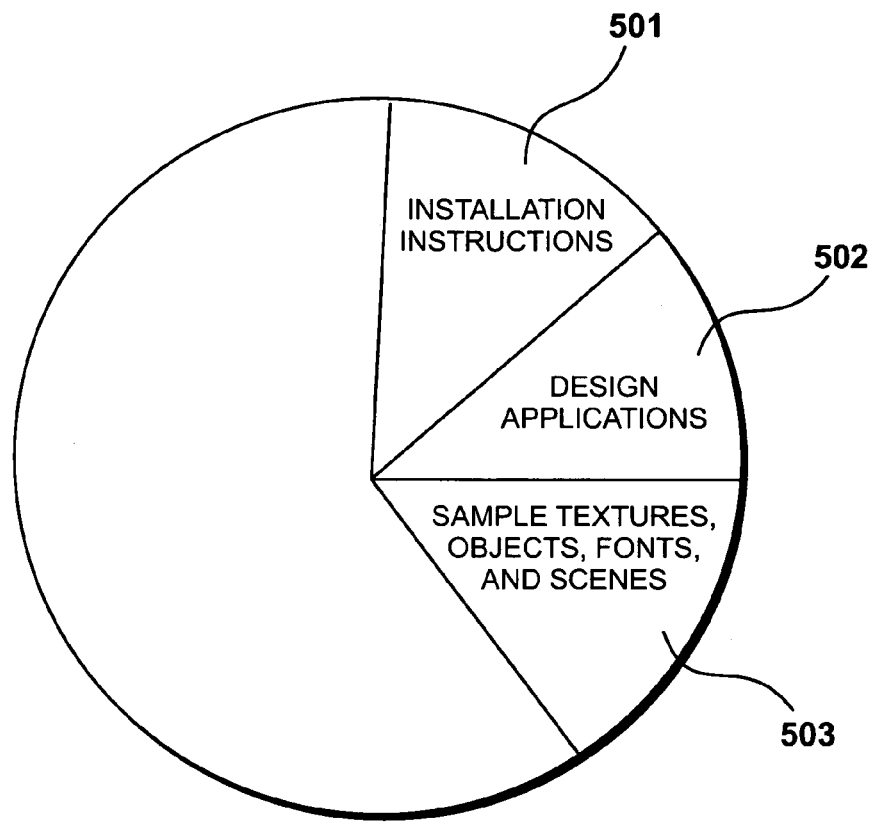
FIG. 5 details data structures shown on the CDROM disk shown in FIG. 1, according to one embodiment of the present invention.
Figure 6:
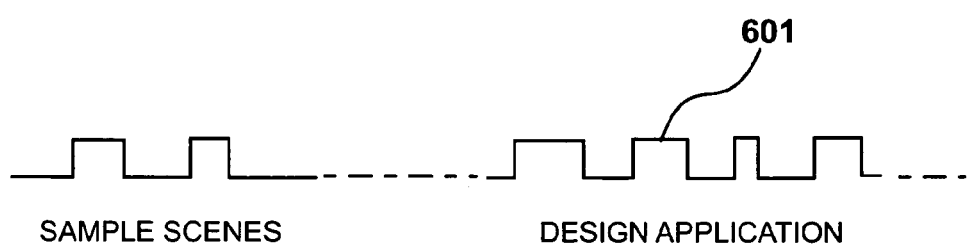
FIG. 6 shows transfer of design application instructions over the network shown in FIG. 1, according to one embodiment of the present invention.

FIG. 5 shows contents of the CDROM 106 shown in FIG. 1, according to one embodiment of the present invention. The arrangement of data is intended to be symbolic and not representative of the actual physical storage configuration on the disk 106 itself. Installation instructions 501 are provided to decompress, format and disperse design application instructions 502 onto the hard disk drive 306. The design application 502 may also be supplied with additional data, such as clipart, textures and fonts as indicated at 503. Design application instructions 502 and data 503 may alternatively be installed over the network 105, according to one embodiment of the present invention, as indicated in FIG. 6. When this is done, the instructions and data are encoded as a serial stream of electrical impulses 601, that are decoded, error corrected, decompressed and installed according to protocols that are well known in the art.

Figure 7:
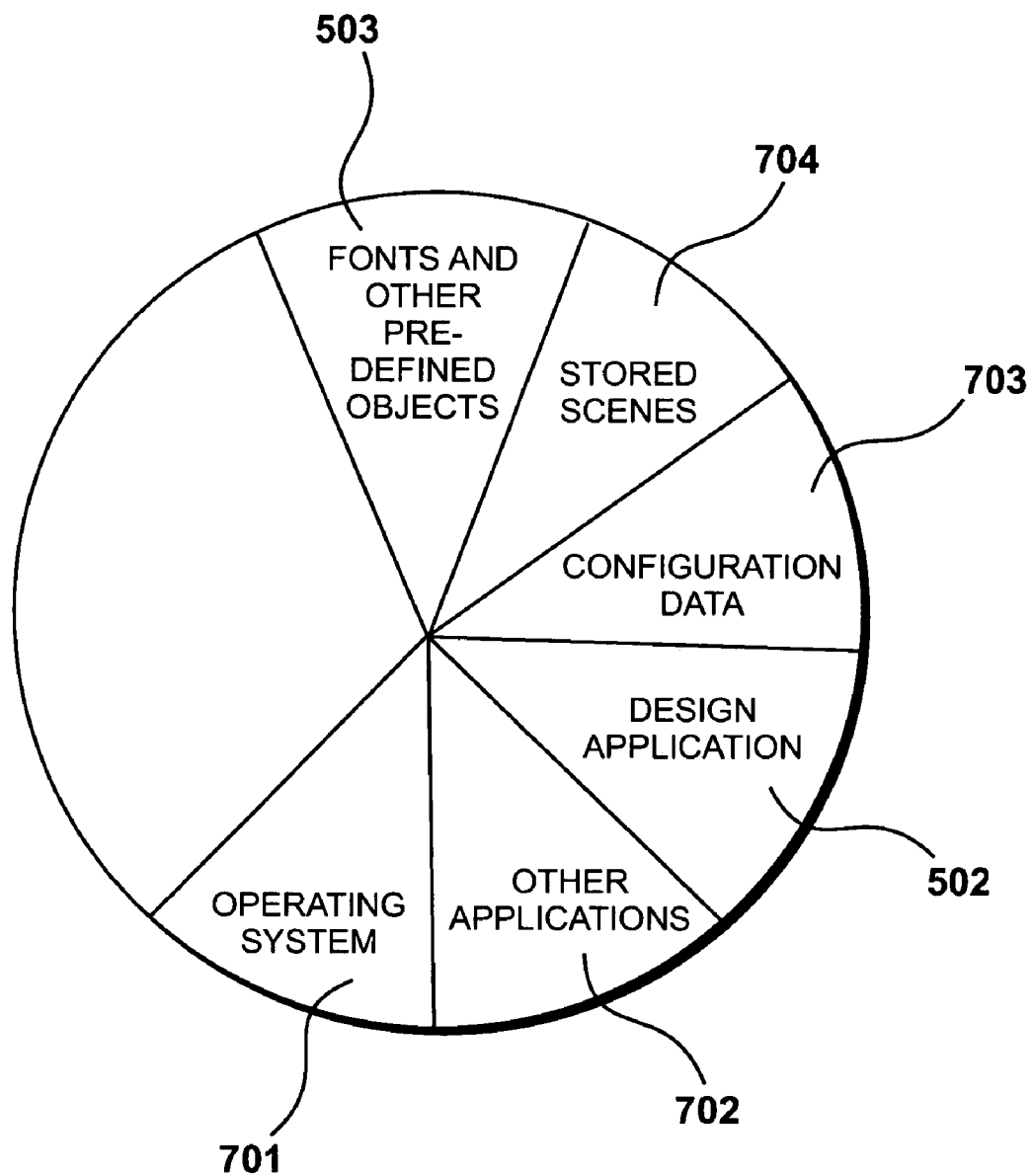
FIG. 7 shows data structures on the hard disk shown in FIG. 3, according to one embodiment of the present invention.

After installation 403 has taken place, the contents of the hard disk drive 306 are updated to provide non-volatile storage of the new instructions and data. Relevant data structures, according to one embodiment of the present invention, are shown in FIG. 7. A Windows™ XP™ operating system 701 provides common functionality and device abstraction for several applications 702 running on the processing system 101. A different operating system may be used, such as a Macintosh™, Unix™ or Linux™ operating system. The design application 502 is located on the hard disc 306 in uncompressed form. Configuration data for the particular processing system 101 is stored at 703, providing the user with various options that are suitable for their working style. Fonts and other pre-defined objects 503 are also stored in uncompressed form, although it is possible that data storage on the hard disk drive 306 or other non-volatile storage unit, may advantageously be stored in compressed form in some circumstances.

Figure 8:
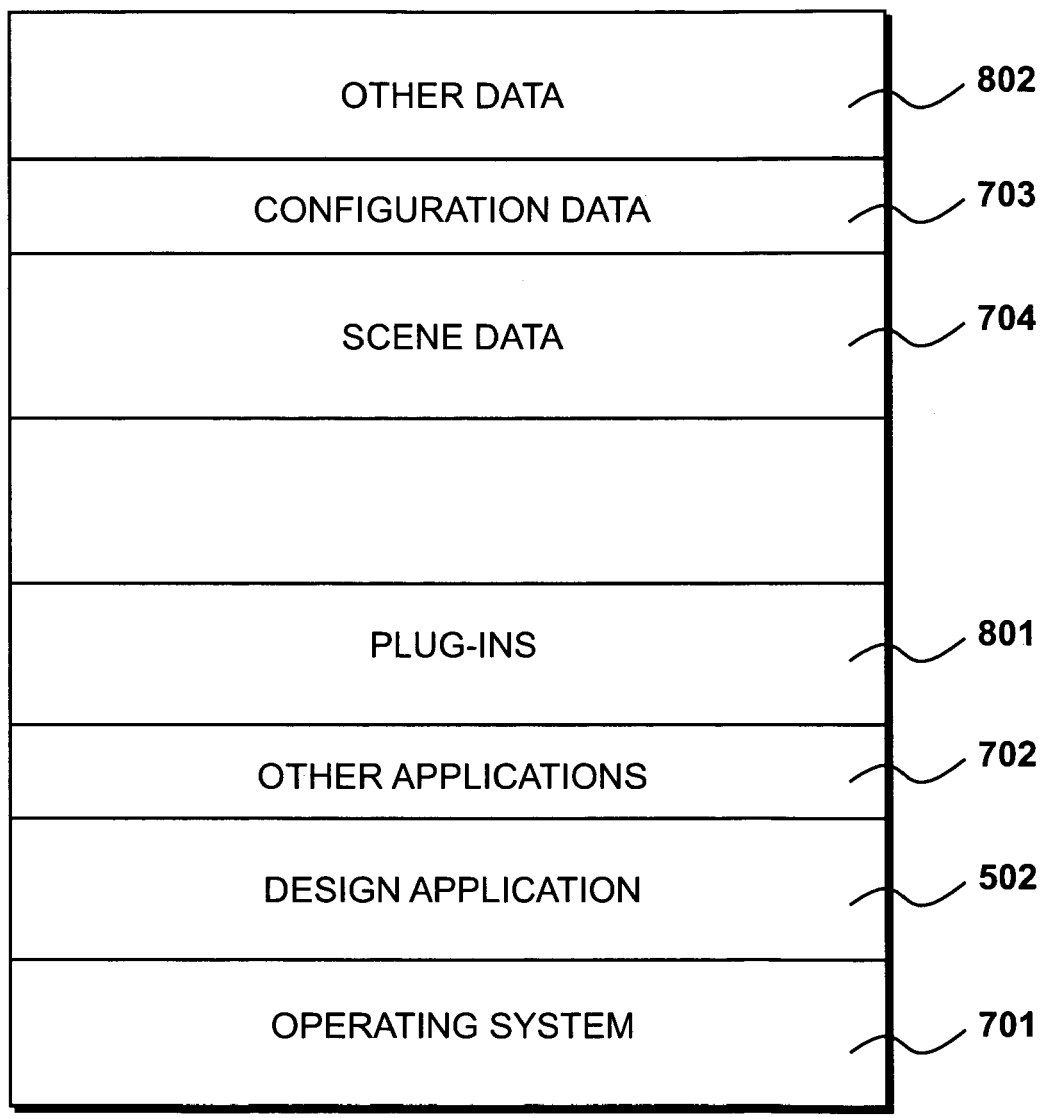
FIG. 8 shows data structures in the main memory shown in FIG. 3, including a scene tree, according to one embodiment of the present invention.

When the user starts execution of the design application instructions 502 at step 404, the contents of the main memory 305 are as shown in FIG. 8, according to one embodiment of the present invention. The contents of the main memory 305 include the operating system 701, the design application 502 and other applications 702. When executing a design application 502 including design instructions for rendering three-dimensional scenes, many different algorithms are applicable to the rendering of effects, including surface shading, lighting and textures. These algorithms are often provided separately from the application 502, in the form of plug-ins 801. Three-dimensional scenes typically include data defining many objects and their characteristics, and these are stored at 704 as scene data. Configuration data 703 includes various configuration options defined by the user to facilitate operation of the design application in ways that are appropriate to a particular working style. Other data 802 includes temporary data structures used by the operating system 701 and other applications 702 during execution of their instructions. For example, when downloading design application 502 updates over the network 105, other data 802 will include a TCP/IP stack for receiving and transferring executable instructions to the hard disk drive 306.

Figure 9:
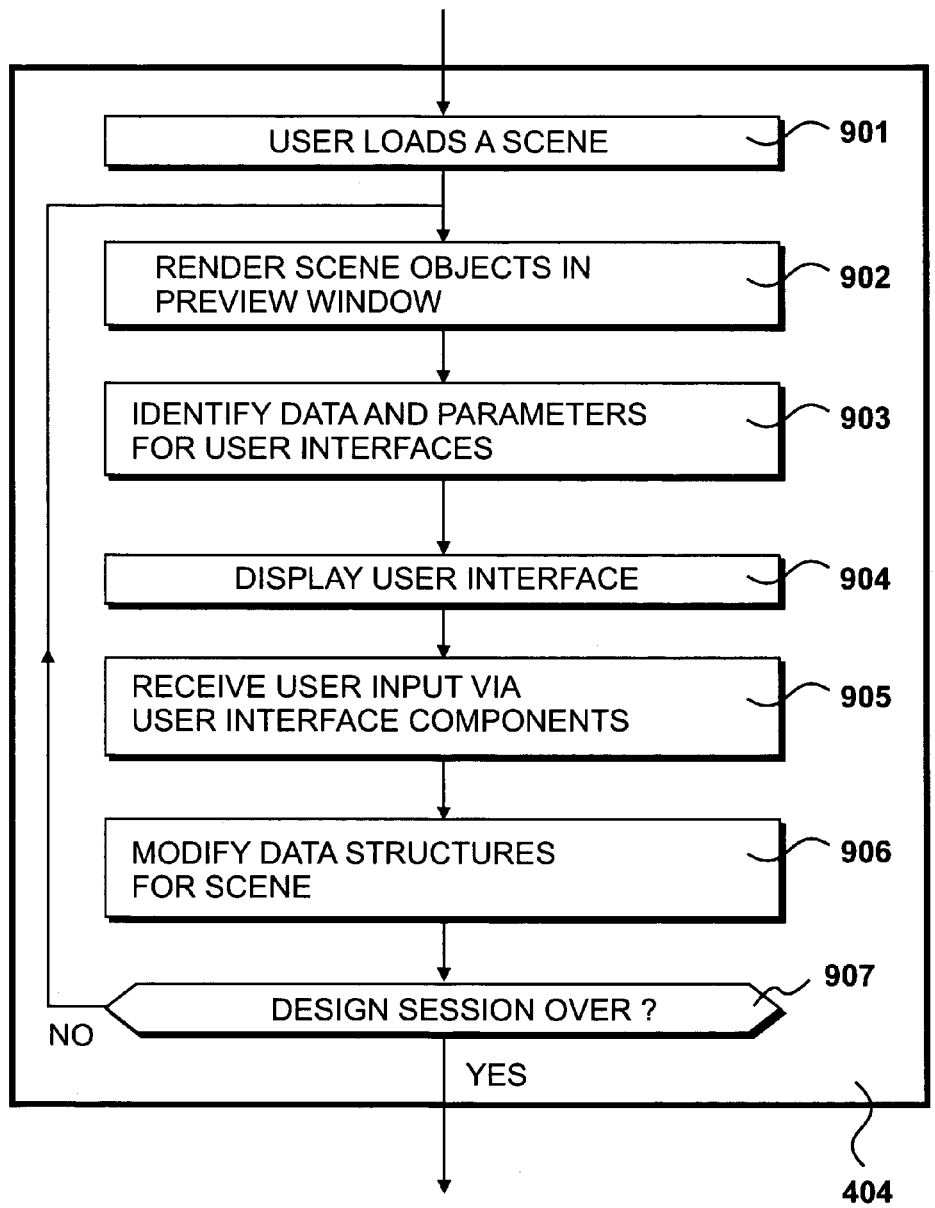
FIG. 9 details the step of running a design application shown in FIG. 4, a step of rendering scene objects and a step of modifying data structures, according to one embodiment of the present invention.

The step 404 of running the design application shown in FIG. 4 is detailed in FIG. 9, according to one embodiment of the present invention. At step 901 the user loads scene data 704 into main memory 305. At step 902, design application rendering instructions are executed to render the objects of the scene in a preview window that is displayed on the monitor 104. At step 903, data and parameters for a user interface are identified. At step 904, user interface components identified at step 903 are rendered and displayed on the monitor 104. At step 905 user input signals are received from the mouse 103, keyboard 102 or other input device via the user interface components displayed at step 904. At step 906, data structures 704 for the scene are modified in response to the user input signals received at step 905. At step 907 a question is asked as to whether the design session is over or not. If not, control is directed to step 902. Alternatively, the design session is concluded.

Figure 10:
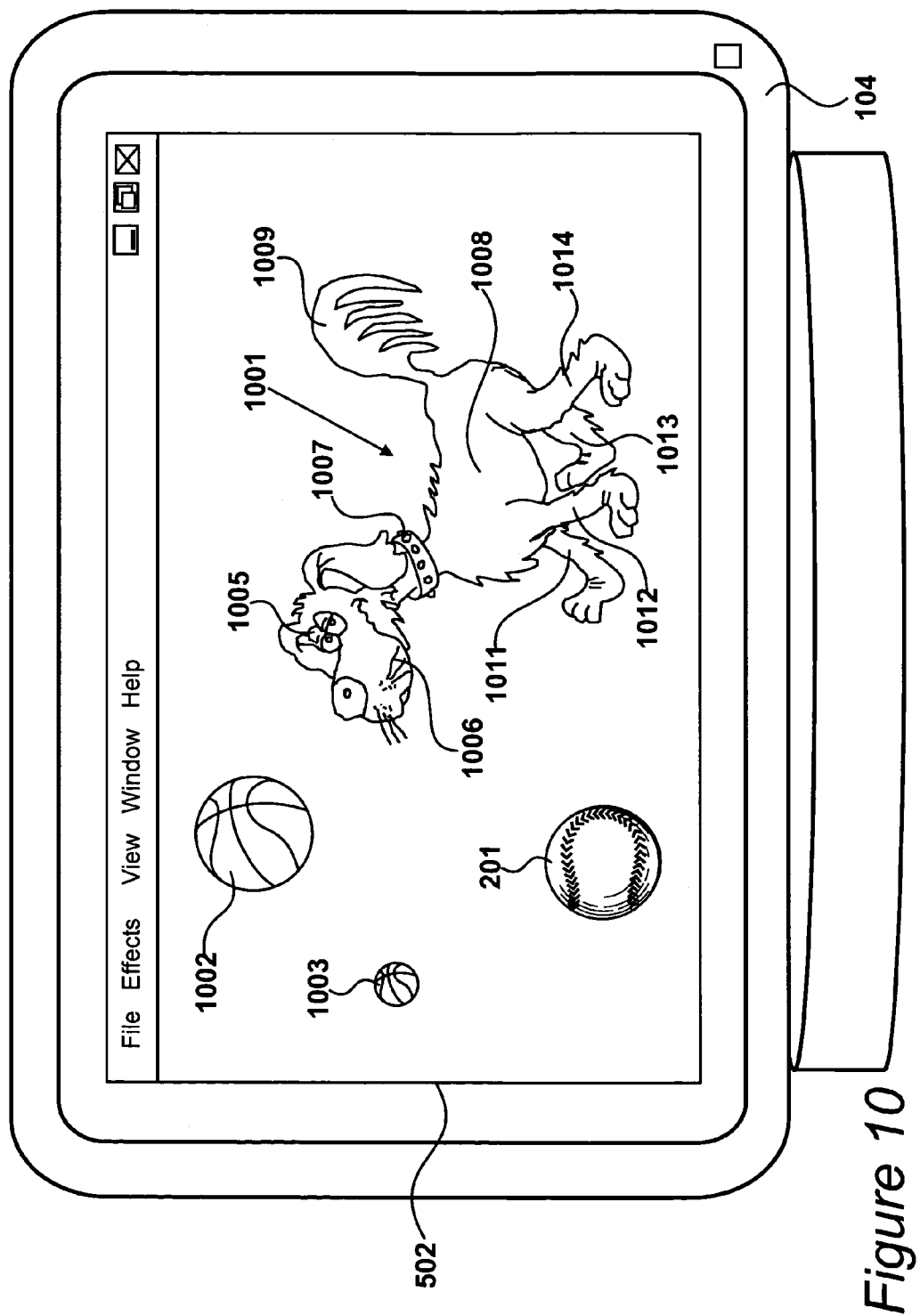
FIG. 10 shows a screenshot of the monitor shown in FIG. 1 during the step of running a design application shown in FIG. 4, according to one embodiment of the present invention.

FIG. 10 shows a typical scene, according to one embodiment of the present invention. The object 201 shown in FIG. 2, a baseball, is part of a larger scene comprising several potentially interacting objects. A dog 1001 is shown playing with three balls 201, 1002 and 1003. The dog 1001 comprises many component objects 1005 to 1014. All these objects may be animated, and may move with respect to each other, as well as having their various properties modified throughout the duration of an animation.

Figure 11:
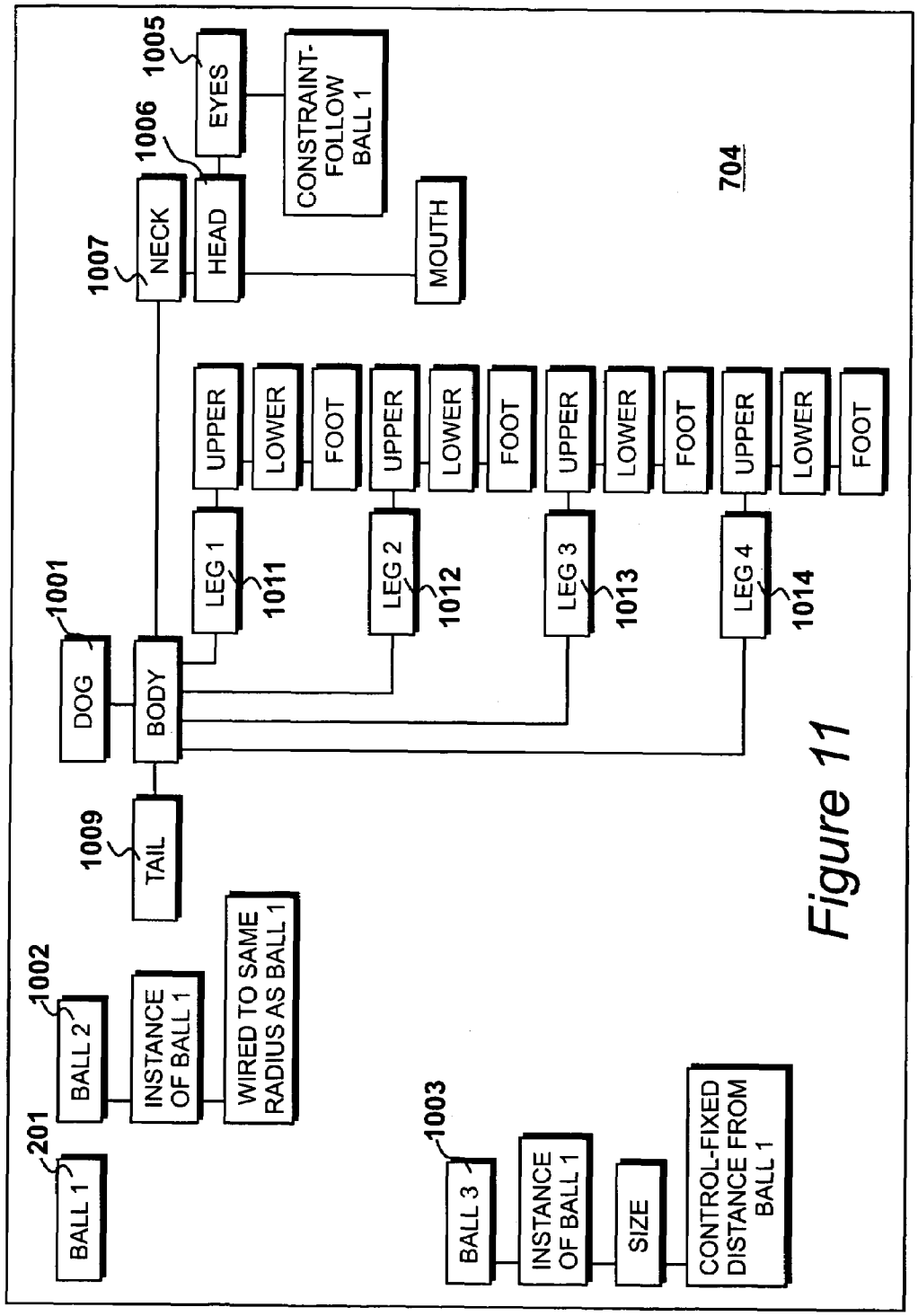
FIG. 11 details the scene tree shown in FIG. 8, including a ball object, according to one embodiment of the present invention.

The scene shown in FIG. 10 is represented by a data structure known as a scene tree. FIG. 11 shows the Main components of the scene tree representing the objects shown in FIG. 10, according to one embodiment of the present invention. The objects are arranged hierarchically, with the dog having several interconnected parts. Full details of the scene tree are not shown. These would include very fine details, such as individual hairs on the dog 1001, and stitching on the baseball 201.

Figure 12:
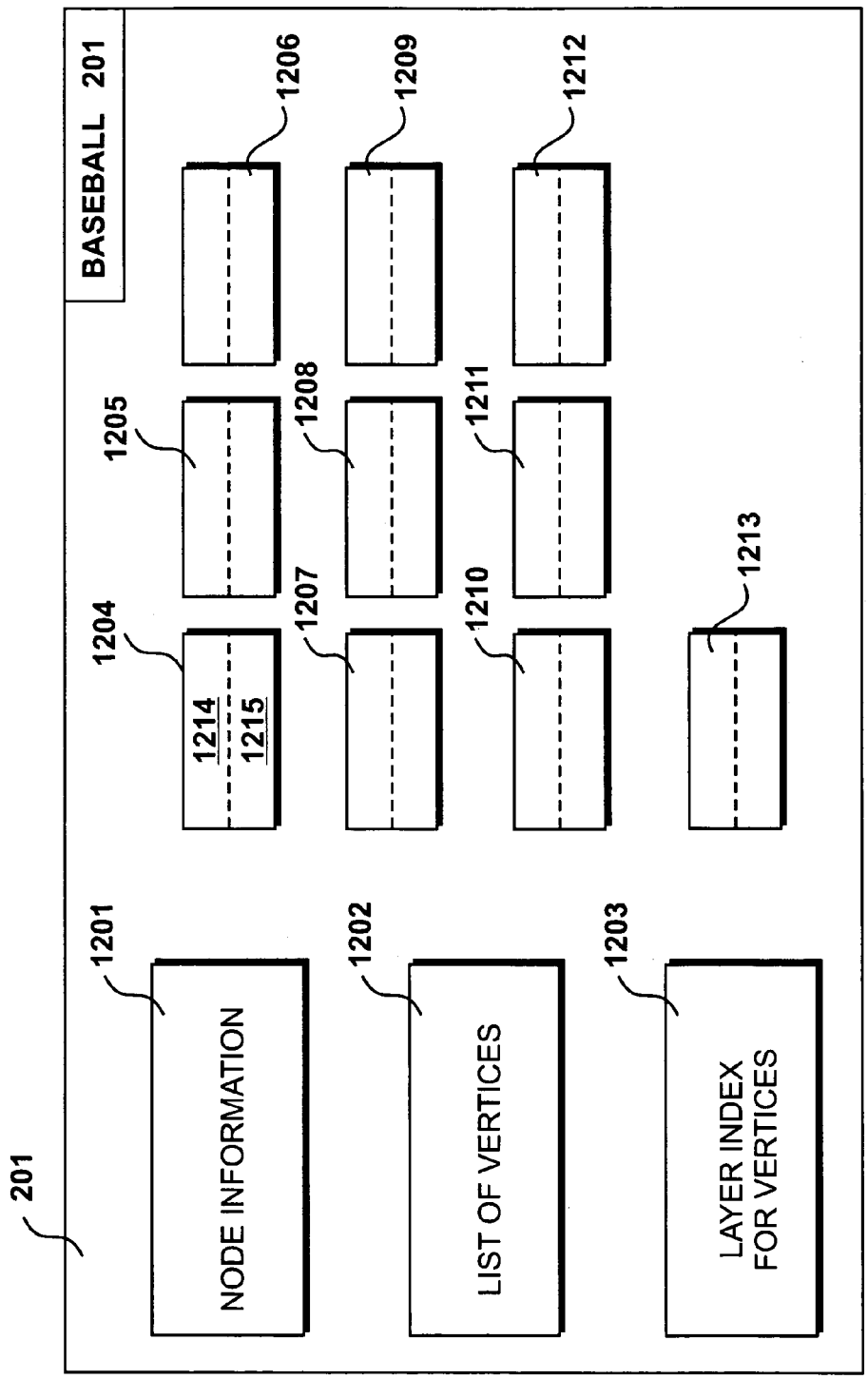
FIG. 12 details data structures for the baseball object shown in FIG. 11, including node information, a list of vertices, a layer index for vertices, and vertices containing vertex node data an a layer stack, according to one embodiment of the present invention.
Figure 16:
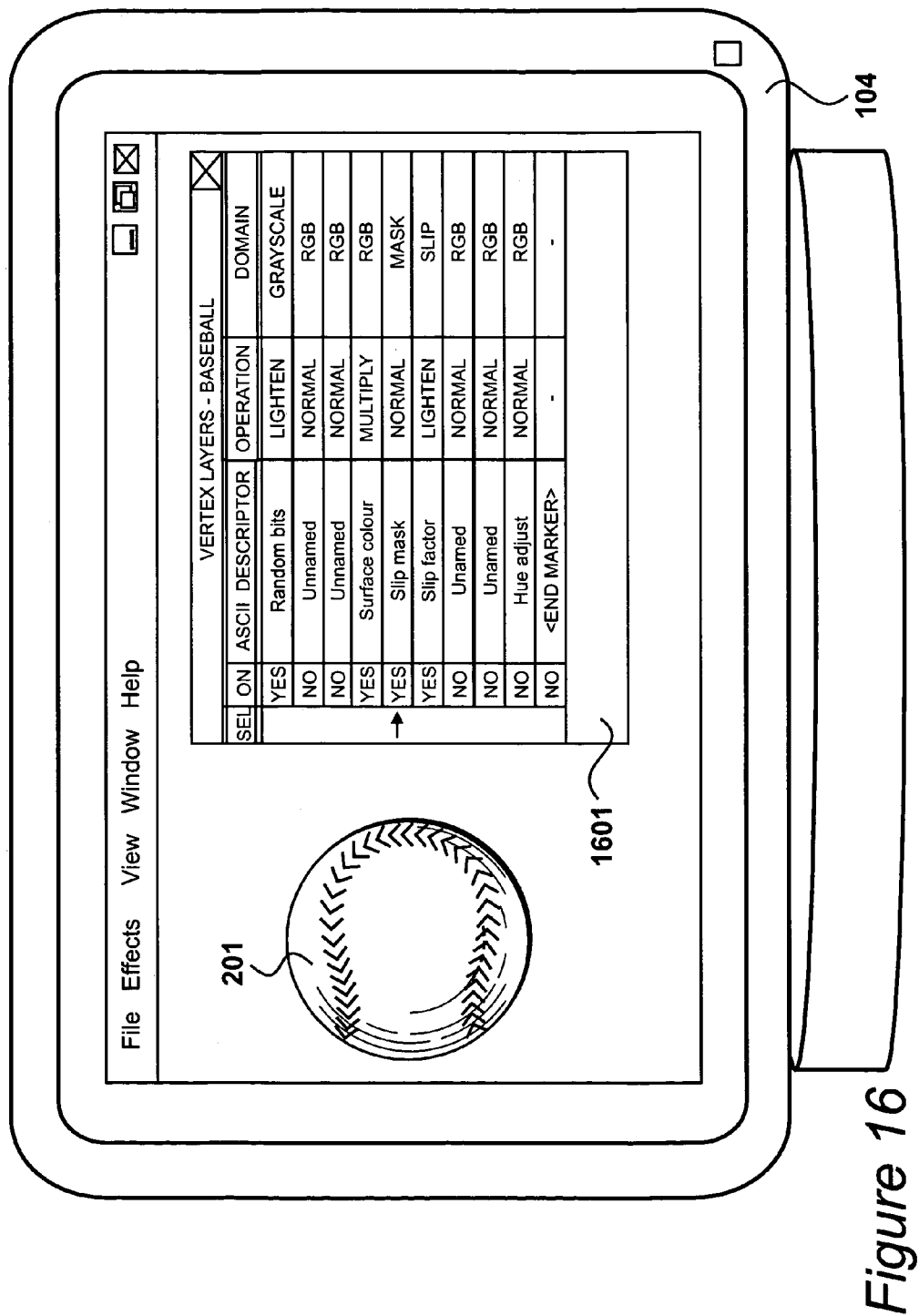
FIG. 16 illustrates a user interface for the layer index shown in FIG. 15, according to one embodiment of the present invention.

Practical implementation of FIG. 2 requires additional data structures in the scene tree 704. FIG. 12 shows suitable data structures for the baseball object 201, according to one embodiment of the present invention. The baseball 201 data structures include: node information 1201, a list of vertices 1202, a layer index 1203 for vertices in the list 1202 and vertices 1204 to 1213, of which only a small number of the total required for the object is shown. Each vertex comprises vertex node data 1214 and a vertex layer stack 1215.

FIG. 13 shows the node information data structure 1201 shown in FIG. 12, according to one embodiment of the present invention. A pointer 1301 to the parent node in the scene tree is provided to maintain scene tree relationships as shown in FIG. 11. A position offset 1302 from the parent node in the scene tree is also provided. The position offset comprises three thirty-two bit floating point numbers, for each of the x, y and z axes of the virtual world in which the object is located. The position offset 1302 may be animated, so that it changes over time, or in response to a real time signal if necessary. In these latter two cases, the absolute values would be augmented by a pointer to another memory location that is updated regularly by animation instructions.

FIG. 14 shows the list of vertices 1202 shown in FIG. 12, according to one embodiment of the present invention. Each vertex 1401 to 1404 in the list 1202 has a pointer to an area of main memory 305 in which the data for each vertex is stored. The final entry 1405 in the list 1202 contains an address value of zero, indicating the end of the list of vertices.

FIG. 15 shows the layer index 1203 for vertices shown in FIG. 12, according to one embodiment of the present invention. The layer index 1203 has four columns 1501, 1502, 1503 and 1504. The first column 1501 determines whether or not a particular layer is active. The second column 1502 is a user-definable string that provides a customisable description of each layer. The third column 1503 defines layer interactions. The fourth column 1504 defines the domain in which the layer data is applied. Generally this will be either a GRAYSCALE or RGB color space. However, domains interact with each other according to how they are defined in the layer index. For example, it is possible to cause a physical vertex domain, such as surface slipperiness, to interact with the vertex color in a meaningful way, such as by changing its brightness. Each layer 1505 to 1514 is represented in the layer index by the four data values 1501 to 1504.

The top layer 1505 operates in the GRAYSCALE domain, and has an operation 1503 that lightens colors of layers 1506 to 1514 beneath it. Layers 1506 and 1507 are not used, but may be switched on by the user by changing the value in the first column 1501. The surface color layer 1508 multiplies its values with the result of layers 1509 to 1514 beneath it. The slip mask layer 1509 defines certain regions of the surface of the baseball 201 where the slipperiness will be able to affect the surface color. The slip factor layer 1510 defines the slipperiness of the surface, and this value has an effect on both surface color and the physics of interactions between the baseball 201 and other objects 1001, 1002 that may come into contact with it in the virtual world. Unnamed layers 1511 and 1512 are currently unused. The hue adjust layer 1513 provides further color definition. The final layer 1514 in the index 1203, is an end marker, signifying the bottom of the list of layers for the object 201.

The layer index 1203 shown in FIGS. 15 and 12 is accessed at step 903 in FIG. 9 in order to create a user interface through which this data structure may be accessed. A suitable interface for modification of the layer index 1203 is shown in FIG. 14. The baseball 201 is displayed so that the effects of layer configuration changes can be observed as they are made. The interface component 1601 for layer configuration has a direct correspondence with the data structure 1203 shown in FIG. 15.

FIGS. 17 and 18 show data structures used for combination of layers for vertices, according to one embodiment of the present invention. Data for each vertex 1204 to 1213 is split into two parts. The first part is vertex node data 1214, and is shown in FIG. 17. Vertex node data 1214 includes a pointer 1701 to a parent node, which in this case is the baseball 201. Vertex node data 1214 further includes a position offset from the parent node 1702 and a pointer 1703 to the layer stack 1215 for the vertex. A vertex layer stack 1215 is shown in FIG. 18, including data values 1801 to 1806 for each of the layers.

The data structures shown in FIGS. 12 and detailed in FIGS. 13, 14, 15, 17 and 18 enable operations for adjusting the surface properties of the baseball 201 to be carried out very swiftly. These data structures are a practical implementation of the concepts shown in FIG. 2. Modifications may be carried out using layers in a highly efficient way. For example, the coloring of the baseball 201 may be changed instantly by switching on or off different layers using the layer switch data column 1501 for an object. Layers may be combined in different ways, to achieve complex and subtle effects, thereby enhancing realism, both in appearance and in the physics of the object in its interactions with other objects in the virtual world.

The properties of each individual vertex may be modified by the user with the aid of simple tools. A particular layer, once selected, may be "painted" using a virtual drawing tool such as a paintbrush. The resulting modifications may affect color or any other of the domains that are available, such as slipperiness. The user may adjust the interaction between the layers using the operation column 1503 of the layer index 1203, thereby making swift adjustments to effects that would otherwise be extremely time consuming to achieve.

Figure 19:
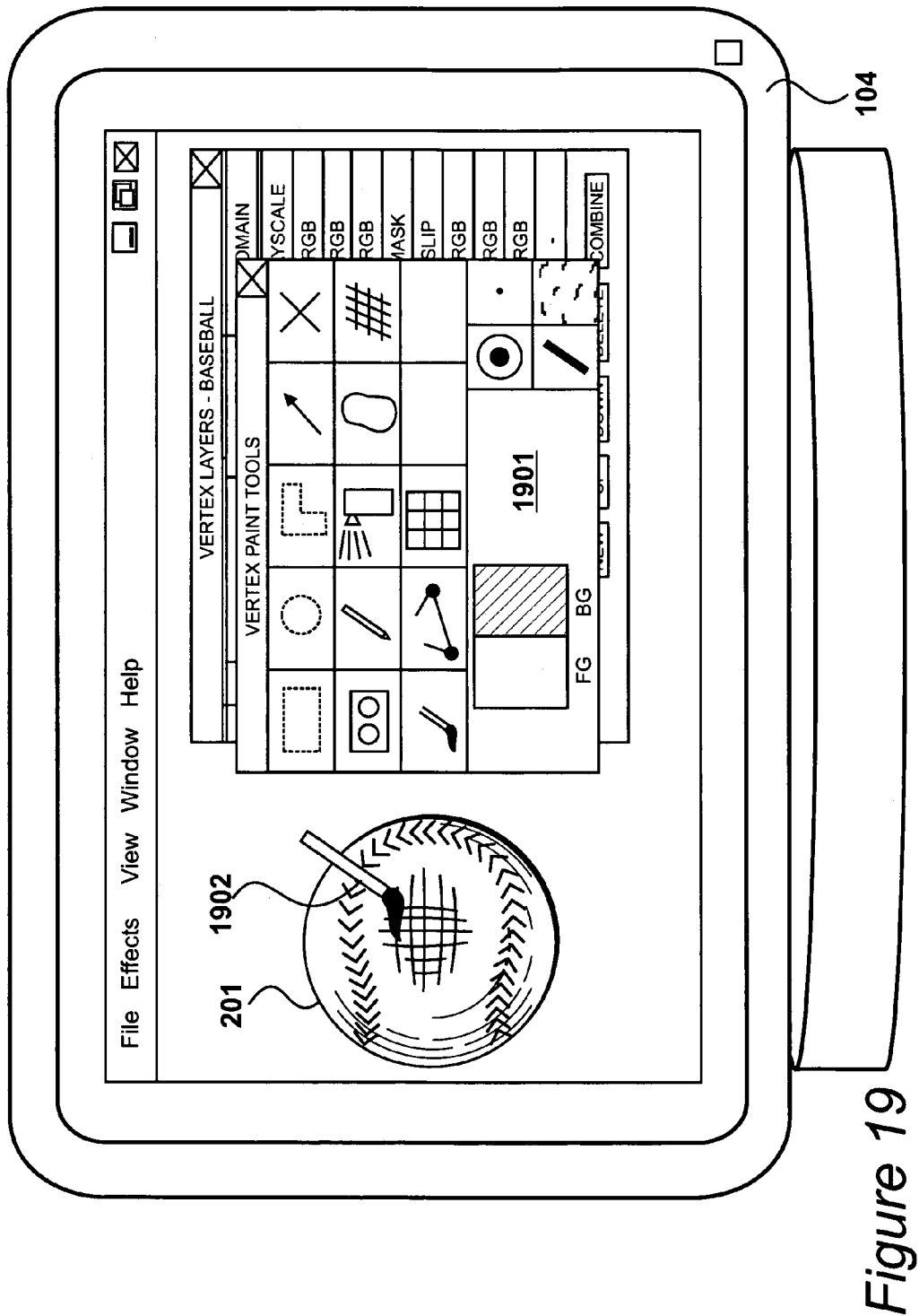
FIG. 19 illustrates an interface for modifying the vertex layer stack shown in FIG. 18, according to one embodiment of the present invention.

FIG. 19 shows a user interface for painting onto a layer, according to one embodiment of the present invention. A paint tool window 1901 enables the user to select one of several tools that can be used to paint colors, effects or other properties onto a collection of vertices on the surface of a selected object 201. A paintbrush 1902 is shown as having been selected by the user. Movement of the mouse 103 enables the paintbrush to be moved. Dragging the mouse with the left button held down enables the paintbrush to make changes to the surface of the object over which it is being moved.

In addition to painting vertices, many other useful operations are possible. The spacing of vertices may be too far apart to achieve a necessary level of detail for variation of a particular surface property. In this situation, the number of vertices may be increased. In order to do this, the added vertices must be provided with suitable initial values, before the user goes on to modify them in some detail.

Figure 20:
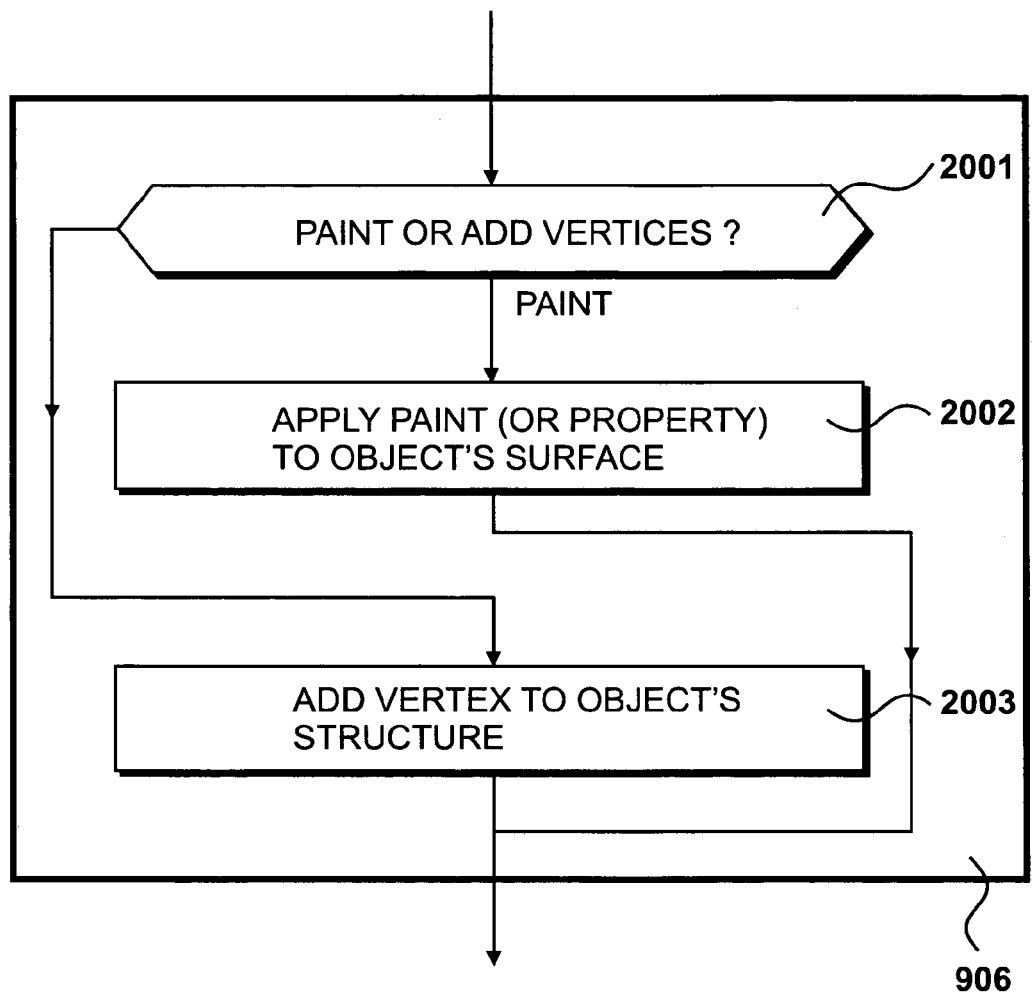
FIG. 20 details the step of modifying data structures shown in FIG. 9, including a step of painting vertices and a step of adding a vertex, according to one embodiment of the present invention.

FIG. 20 shows the step 906 of modifying data structures for a scene shown in FIG. 9, according to one embodiment of the present invention. At step 2001 a question is asked as to whether the user wants to paint vertices or add vertices. If painting is selected, control is directed to step 2002. Alternatively control is directed to step 2003. At step 2002 the object surface is painted, either with a color or some other visible or non-visible surface property. If a surface property is invisible, it can be rendered visible for the purposes of the paint process. Alternatively, at step 2003, adding one or several vertices to an object is performed.

Figure 21:
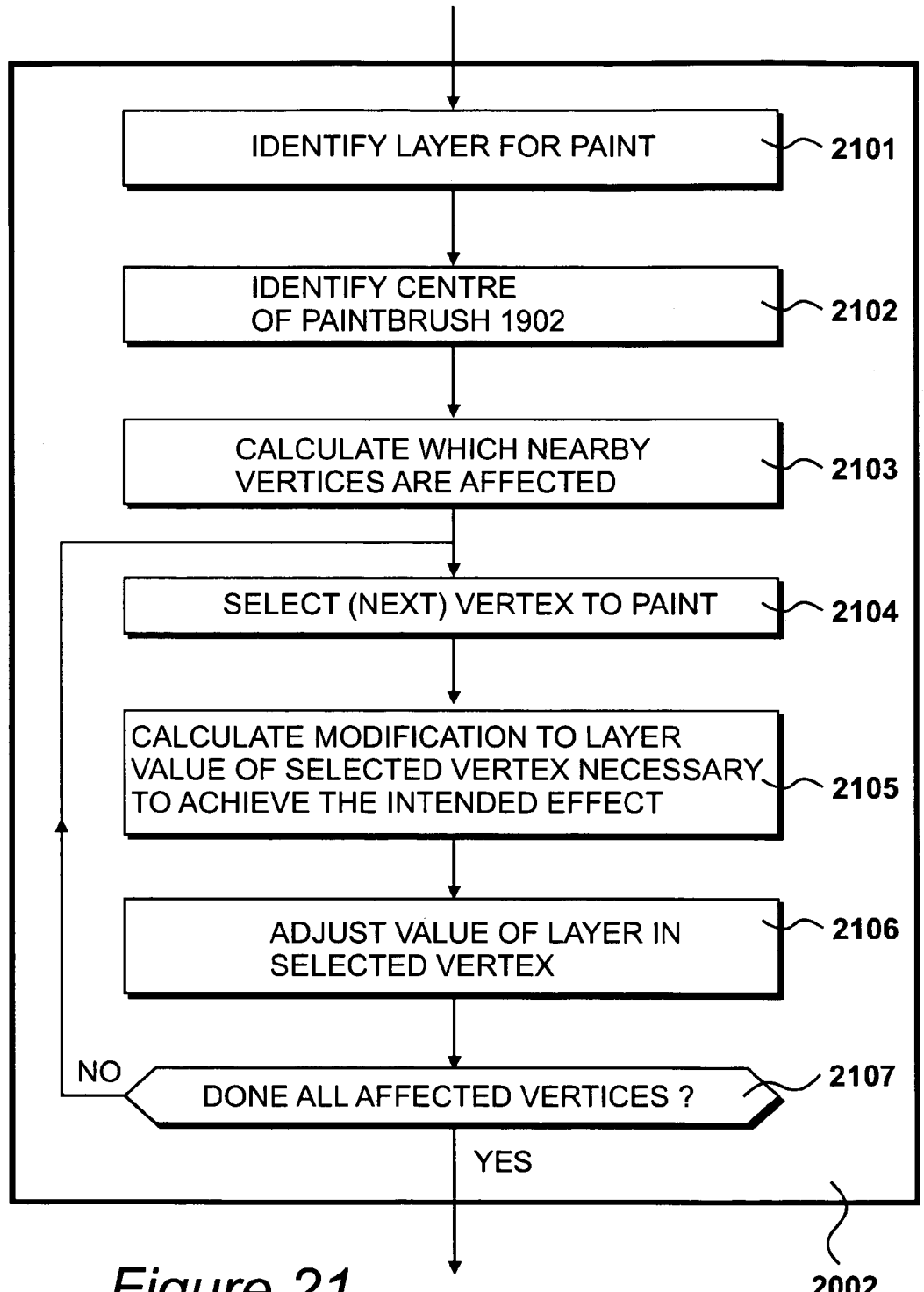
FIG. 21 details the step of painting vertices shown in FIG. 20, according to one embodiment of the present invention.

Vertex painting 2002, shown in FIG. 20, is detailed in FIG. 21, according to one embodiment of the present invention. At step 2101 a layer is identified in which vertex layer data will be modified. Typically this will be a layer in the RGB color domain, but other domains are possible, including "slipperiness" of the surface, as shown for layer 1510 in FIG. 15. At step 2102 the centre of the virtual paintbrush 1902 is identified. The virtual paintbrush 1902 moves over the surface, changing data values for vertices nearby, or under it as it goes. At step 2103 a calculation is performed to identify which nearby vertices are affected by the paint operation, and to what degree. At step 2104 the first affected vertex is selected. At step 2105 an appropriate adjustment is calculated for the data value in the selected layer for the vertex. At step 2106 the value stored in the vertex for that layer is updated. At step 2107 a question is asked as to whether all affected vertices have been updated. If not, control is directed back to step 2104, and steps 2104 to 2107 are repeated for each additional affected vertex. Eventually, all affected vertices will have been updated, concluding the processing steps for an iteration of the paint process. As the paint process is carried out in real time, the steps shown in FIG. 21 are repeated regularly several times a second, so that as the user moves the mouse around, continuous changes are made to the appearance of the surface of the object 201.

Figure 22:
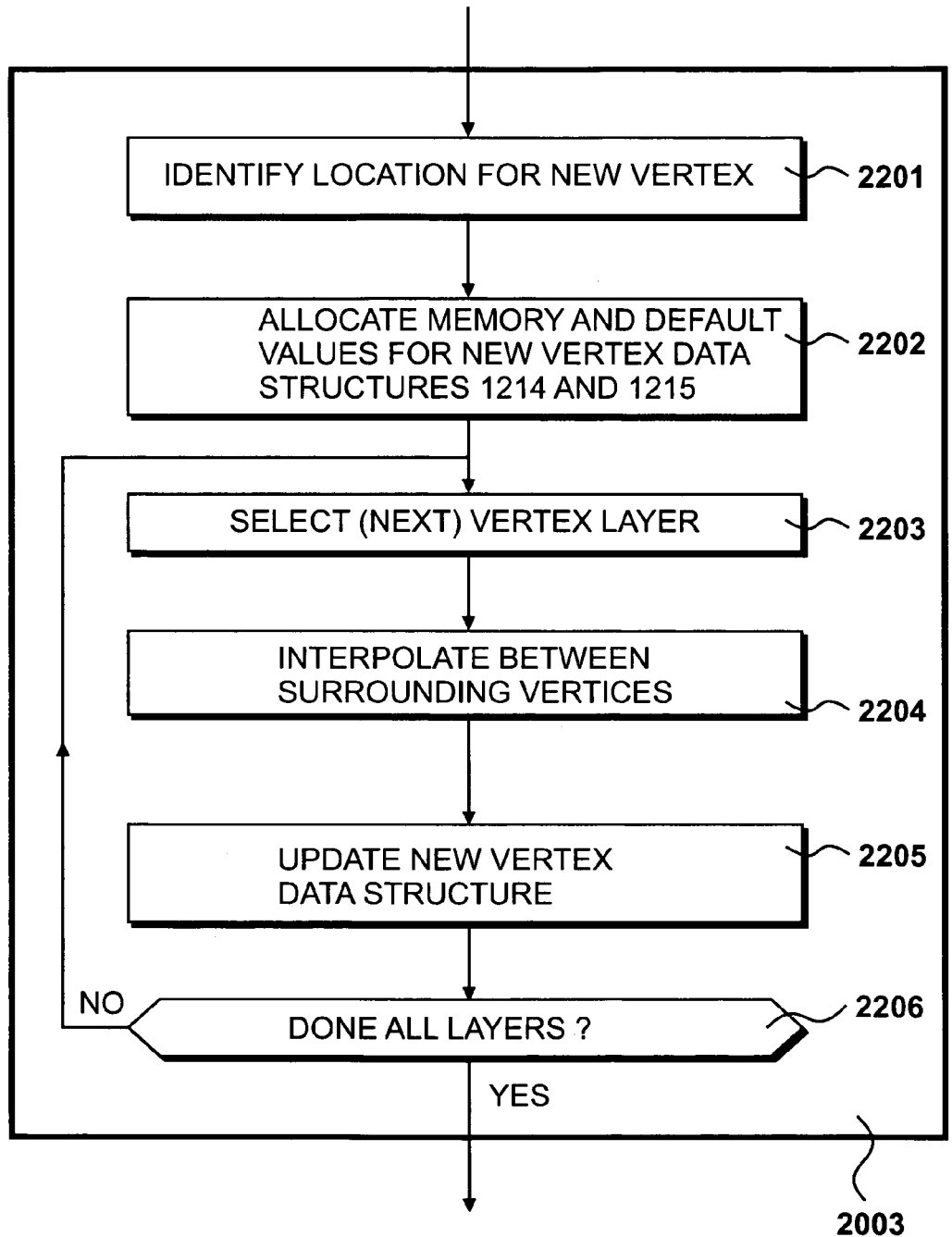
FIG. 22 details the step of adding a vertex shown in FIG. 20, according to one embodiment of the present invention.

Adding a vertex to an object, shown at step 2003 in FIG. 20, is detailed in FIG. 22, according to one embodiment of the present invention. At step 2201 the location for a new vertex is identified in response to user input from the mouse 103, keyboard 102 or other input device. A new vertex location is shown at 228 in FIG. 2. At step 2202 memory is allocated and default values set for the data structures for the new vertex. Layer data values are not defined at this stage. At step 2203 the layer of the new vertex is selected. At step 2204 an interpolation is performed between surrounding vertices 202, 203, 204 and 205. This results in a unique data value for that layer in the new vertex. At step 2205, the layer's data value is updated. At step 2206 a question is asked as to whether all the layers in the vertex have been processed. If not, control is directed back to step 2203, and the steps 2203 to 2206 are repeated for all layers. Eventually all layers will have been updated with interpolated data values, resulting in a complete layer stack for the new vertex 228.

The information contained in the layer stacks for each vertex can relate to more than one domain. The RGB domain affects the color of the surface of an object. Layers 1506 to 1508, 1511 to 1513 are assigned to the RGB domain. Layer 1505 is assigned to the GRAYSCALE domain, and can affect the color of other RGB and GRAYSCALE data in the layer stack. The SLIP domain relates to the slipperiness of the surface, which is a physical property that affects the physical interaction between objects. These domains can affect each other, and layer interactivity 1503 can be used to set up relationships between layers so that they can interact in a useful way. Examples of this include using the slipperiness layer to affect the color of the surface of a ball 201. Additionally, a specular component can be varied with the use of layers. A slippery part of a surface can then be made more reflective. Variations in these values can be made in real time, and data structures of this kind are especially valuable when it is the intention to imitate several subtle qualities of physical objects that change in real time.

Figure 23:
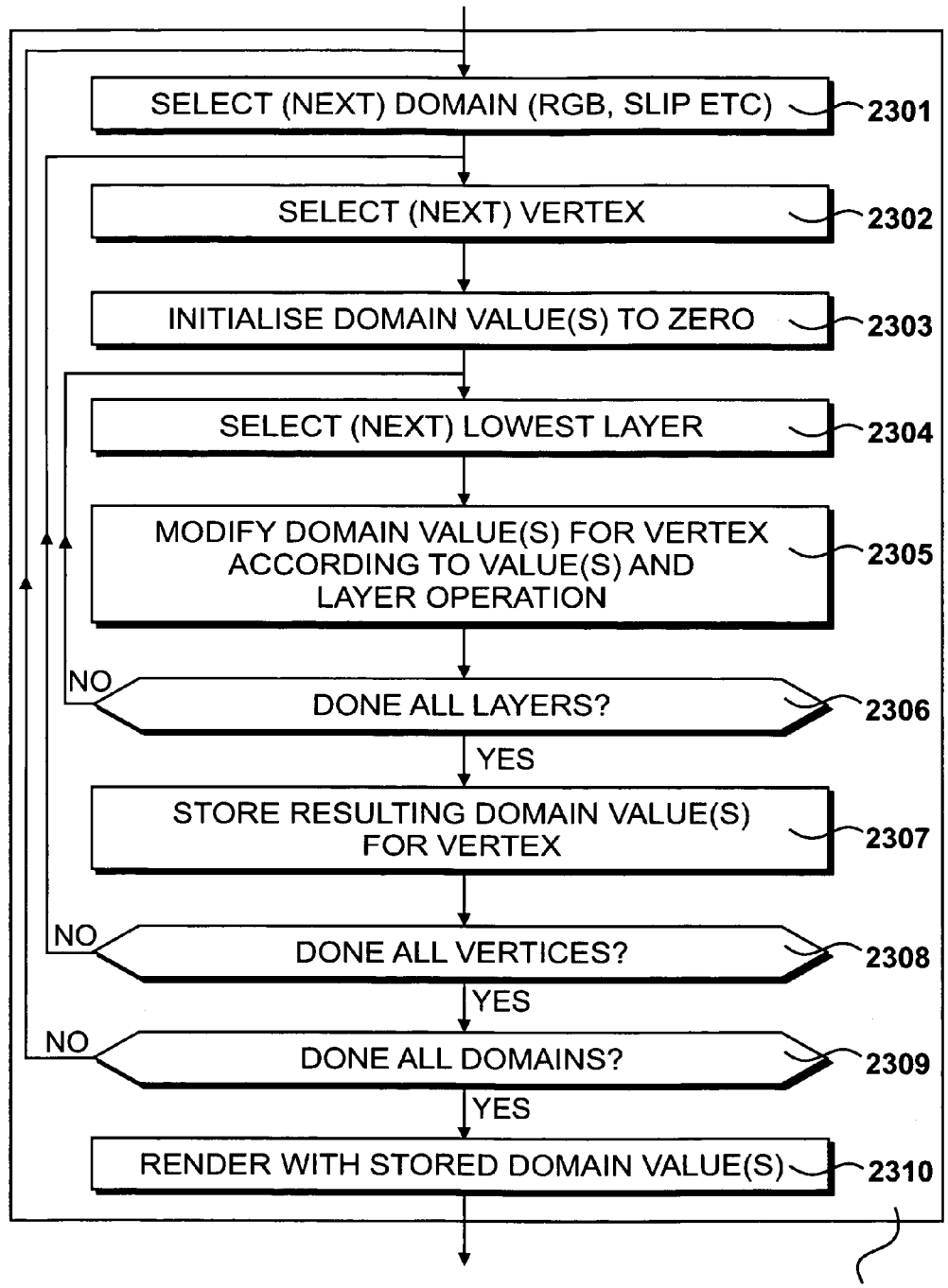
FIG. 23 details the step of rendering scene objects shown in FIG. 9, according to one embodiment of the present invention.

Rendering of scene objects, shown at step 902 in FIG. 9, is detailed in FIG. 23, according to one embodiment of the present invention. At step 2301 the first domain is selected. At step 2302 the first vertex in the scene tree is selected. At step 2303 the domain value for that vertex is initialised to zero. At step 2304 the lowest layer is selected in the layer stack for that vertex. At step 2305 the domain values for the vertex are updated according to the specified layer interaction 1503 and data 1801 to 1806. At step 2306 a question is asked as to whether all layers have been considered for the vertex. If not, control is directed back to step 2304, and steps 2304 to 2306 are repeated for the next lowest layer in the current vertex. This continues until all layers have been considered, working from the lowest layer 1806 up to the highest 1801. The layer interactions 1503 are cumulative, and can involve multiplications, divisions, additions, subtractions or non-linear effects such as "burn", "darken" or "lighten".

At step 2307 the result of combining all the layers for the vertex are stored as the domain value for the vertex, for example, updating RGB values, or a SLIP value. At step 2308 a question is asked as to whether all vertices in the scene have been considered. If not, steps 2302 to 2308 are repeated until all vertices have been processed. At step 2309 a question is asked as to whether all domains have been considered. If not, steps 2301 to 2309 are repeated until all domains have been processed for all vertices and all layers. At step 2310, final rendering is performed, in which domain values for all the vertices in the scene are taken into account to generate a fully rendered image. This includes interpolation between vertices to obtain smooth surfaces and properties using known techniques such as phong shading, and optionally the application of a light rendering algorithm such as radiosity or ray-tracing to provide fine detail or photo-realism.

It is possible to use the data structures described to facilitate cross-fading between pre-rendered layers for different lighting configurations, by modifying one layer's RGB components using another layer's control value. Two such sets of control pairs in the same layer stack facilitate implementation of real time variation of radiosity or ray-traced light settings.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer readable medium storing instructions for causing a computer to define surface properties of an object whose structure is defined by a set of vertices by performing the steps of:
   receiving the set of vertices including position information and an index of layers storing a plurality of interacting layers for each vertex in the set of vertices, wherein each interacting layer includes an enable flag indicating whether or not the interacting layer should be processed and a layer interaction definition specifying an operation used to process the interacting layer
   processing the plurality of interacting layers for each vertex of the set of vertices to produce vertex layer stacks that define the surface properties of the object, each vertex layer stack including vertex layer values representing physical properties for each one of the interacting layers in the plurality of interacting layers; and
   wherein the step of processing the plurality of interacting layers for each vertex of the set of vertices is performed by starting with a lowest layer in the plurality of interacting layers and modifying the vertex layer values for a first domain specified in the plurality of interacting layers for each higher layer in the plurality of interacting layers before modifying the vertex layer values for another domain specified in the plurality of interacting layers.

2. The computer readable medium of claim 1, further comprising the step of displaying an interface to receive user input specifying layer interaction definitions for the plurality of interacting layers.

3. The computer readable medium of claim 1, further comprising the step of receiving an input specifying a modification to a vertex layer value.

4. The computer readable medium of claim 3, further comprising the step of determining nearby vertices affected by the modification.

5. The computer readable medium of claim 4, further comprising the step of adjusting vertex layer values for each nearby vertex affected by the modification.

6. The computer readable medium of claim 1, further comprising the steps of:
   receiving user inputs that specify an additional vertex; and
   interpolating the vertex layer values of at least two vertices within the set of vertices to produce vertex layer values for the additional vertex to define surface properties of said object at the additional vertex.

7. The computer readable medium of claim 1, wherein each interacting layer in the plurality of interacting layers includes a domain feature for each vertex layer value that defines a domain for which the layer interaction definition is applied, wherein a domain specifies a color space or a physical property that affects physical interactions between objects.

8. The computer readable medium of claim 1, wherein the plurality of interacting layers for the set of vertices includes a last layer that is an end marker for the plurality of interacting layers.

9. A method of defining surface properties of an object whose structure is defined by a set of vertices, the method comprising the steps of:

receiving the set of vertices including position information and an index of layers storing a plurality of interacting layers for each vertex in the set of vertices, wherein each interacting layer includes an enable flag indicating whether or not the interacting layer should be processed and a layer interaction definition specifying an operation used to process the interacting layer;

processing the plurality of interacting layers for each vertex of the set of vertices to produce vertex layer stacks that define the surface properties of the object, each vertex layer stack including vertex layer values representing physical properties for each one of the interacting layers in the plurality of interacting layers;

wherein the step of processing the plurality of interacting layers for each vertex of the set of vertices is performed by starting with a lowest layer in the plurality of interacting layers and modifying the vertex layer values for a first domain specified in the plurality of interacting layers for each higher layer in the plurality of interacting layers before modifying the vertex layer values for another domain specified in the plurality of interacting layers.

10. The method of claim 9, further comprising the step of displaying an interface to receive user input specifying layer interaction definitions for the plurality of interacting layers.

11. The method of claim 9, further comprising the step of receiving an input specifying a modification to a vertex layer value.

12. The method of claim 11, further comprising the step of determining nearby vertices affected by the modification.

13. The method of claim 12, further comprising the step of adjusting vertex layer values for each nearby vertex affected by the modification.

14. The method of claim 9, further comprising the steps of:

receiving user inputs that specify an additional vertex; and interpolating the vertex layer values of at least two vertices within the set of vertices to produce vertex layer values for the additional vertex to define surface properties of said object at the additional vertex.

15. A system for defining surface properties of an object whose structure is defined by a set of vertices, the system comprising:

means for receiving the set of vertices including position information and an index of layers storing a plurality of interacting layers for each vertex in the set of vertices, wherein each interacting layer includes an enable flag indicating whether or not the interacting layer should be processed and a layer interaction definition specifying an operation used to process the interacting layer;

means for processing the plurality of interacting layers for each vertex of the set of vertices to produce vertex layer stacks that define the surface properties of the object, each vertex layer stack including vertex layer values representing physical properties for each one of the interacting layers in the plurality of interacting layers; and wherein processing the plurality of interacting layers for each vertex of the set of vertices is performed by starting with a lowest layer in the plurality of interacting layers and modifying the vertex layer values for a first domain specified in the plurality of interacting layers for each higher layer in the plurality of interacting layers before modifying the vertex layer values for another domain specified in the plurality of interacting layers.

16. The system of claim 15, further comprising means for displaying the surface.

17. The system of claim 15, further comprising means for displaying an interface to receive user input specifying layer interaction definitions for the plurality of interacting layers.

18. The system of claim 15, further comprising means for receiving an input specifying a modification to a vertex layer value.

19. The system of claim 15, further comprising:

means for receiving user inputs that specify an additional vertex; and means for interpolating the vertex layer values of at least two vertices within the set of vertices to produce vertex layer values for the additional vertex to define surface properties of said object at the additional vertex.

* * * * *